US009253971B2

(12) United States Patent
Rivera

(10) Patent No.: US 9,253,971 B2
(45) Date of Patent: *Feb. 9, 2016

(54) NESTABLE DISPOSABLE CONTAINER FOR PEST ELECTROCUTION

(76) Inventor: Adrian Rivera, Whittier, CA (US)

( * ) Notice: Subject to any disclaimer, the term of this patent is extended or adjusted under 35 U.S.C. 154(b) by 383 days.

This patent is subject to a terminal disclaimer.

(21) Appl. No.: 13/546,921

(22) Filed: Jul. 11, 2012

(65) Prior Publication Data

US 2014/0013649 A1    Jan. 16, 2014

Related U.S. Application Data

(63) Continuation-in-part of application No. 12/406,452, filed on Mar. 18, 2009, now Pat. No. 8,621,777.

(51) Int. Cl.
*A01M 23/38* (2006.01)
*A01M 19/00* (2006.01)
*H05C 1/02* (2006.01)

(52) U.S. Cl.
CPC ..................... *A01M 23/38* (2013.01)

(58) Field of Classification Search
CPC ..... A01M 1/023; A01M 1/223; A01M 1/226; A01M 29/26; A01M 1/00; A01M 23/38; A01M 29/24; A01M 21/04
USPC ..................... 43/112, 107, 98, 99, 124, 132.1
See application file for complete search history.

(56) References Cited

U.S. PATENT DOCUMENTS

| 2,581,327 | A | | 1/1952 | Knox, III |
| 2,707,745 | A | | 5/1955 | Farr et al. |
| 2,995,862 | A | | 8/1961 | Pimentel |
| 3,197,916 | A | | 8/1965 | Cole, Jr. et al. |
| 3,343,744 | A | | 9/1967 | Morell et al. |
| 4,074,456 | A | | 2/1978 | Tidwell |
| 4,497,130 | A | | 2/1985 | Fitzgerald |
| 4,780,985 | A | | 11/1988 | Coots |
| 4,959,923 | A | * | 10/1990 | Aiello et al. ............... 43/112 |
| 5,269,091 | A | * | 12/1993 | Johnson et al. ............ 43/98 |
| 5,369,907 | A | | 12/1994 | Lee |
| 5,477,635 | A | * | 12/1995 | Orsano .............. A01M 23/30 43/81 |
| 6,009,662 | A | * | 1/2000 | Chang ..................... 43/112 |
| 6,516,558 | B1 | * | 2/2003 | Lingren ............. A01M 1/02 43/107 |

(Continued)

FOREIGN PATENT DOCUMENTS

| FR | 2 689 371 A1 | 2/1987 |
| JP | 2007-167009 | 5/2007 |
| JP | 2007-195507 | 9/2007 |

*Primary Examiner* — David Parsley
*Assistant Examiner* — George Andonyan
(74) *Attorney, Agent, or Firm* — Kenneth L. Green; Averill & Green

(57) ABSTRACT

A method and apparatus for electrocution and disposal of pests, the apparatus including a reusable power source and a low cost disposable container. The reusable power source includes batteries and a circuit to provide a high voltage and low current signal to the disposable container, to electrocute small pests without presenting a risk to humans or pets. The disposable container is constructed from low cost material, for example, cardboard or plastic, and in one embodiment may be nested for efficient retail packaging. The nesting may be accomplished using tapered disposable containers or a series of decreasing size containers. A container floor includes conducting surfaces formed or glued on the floor. Internal leads and connector surfaces are similarly formed on sides and a rear of the container. The connector surfaces are configured to connect to the power source.

20 Claims, 12 Drawing Sheets

(56) References Cited

U.S. PATENT DOCUMENTS

| | | |
|---|---|---|
| 6,993,867 B2 | 2/2006 | Toyota |
| 7,530,195 B2 | 5/2009 | Muller et al. |
| 2001/0009399 A1* | 7/2001 | Barber et al. ............. 340/573.2 |
| 2005/0284015 A1 | 12/2005 | Greisman |
| 2007/0039233 A1* | 2/2007 | Lawson, Jr. ..................... 43/98 |
| 2008/0216387 A1 | 9/2008 | Peters |
| 2009/0102600 A1* | 4/2009 | Noe .................. A01M 23/38 340/3.1 |

\* cited by examiner

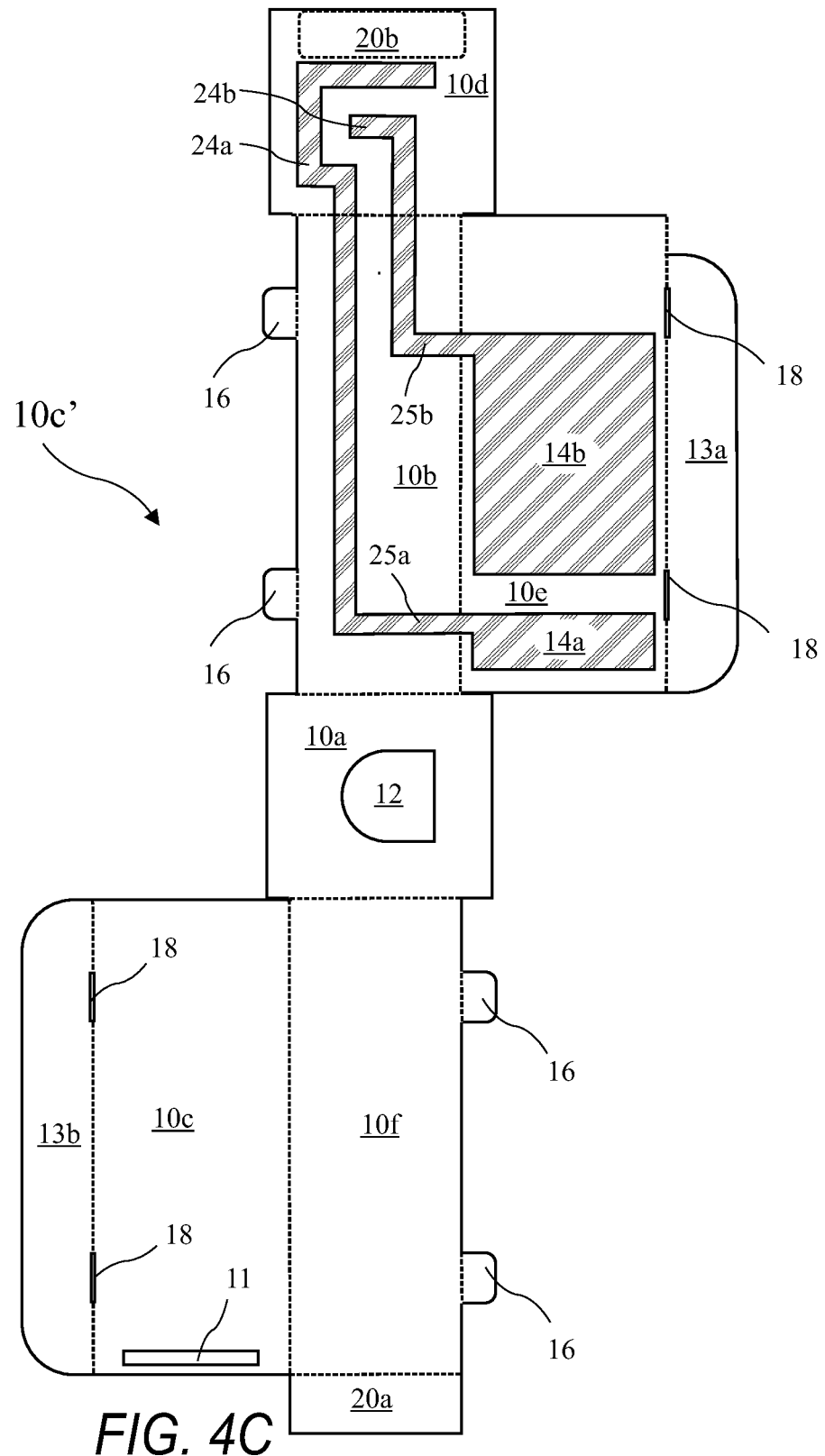

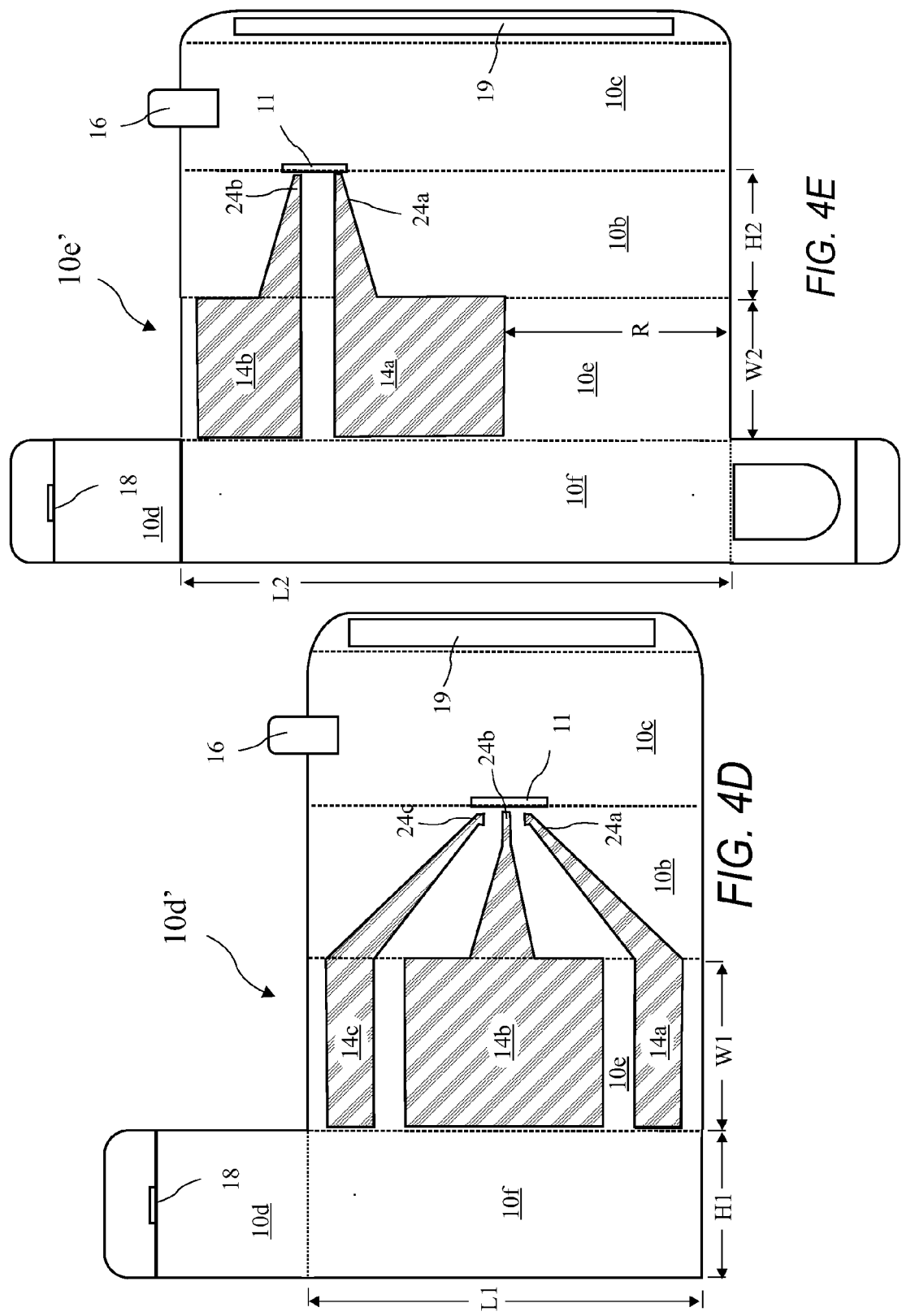

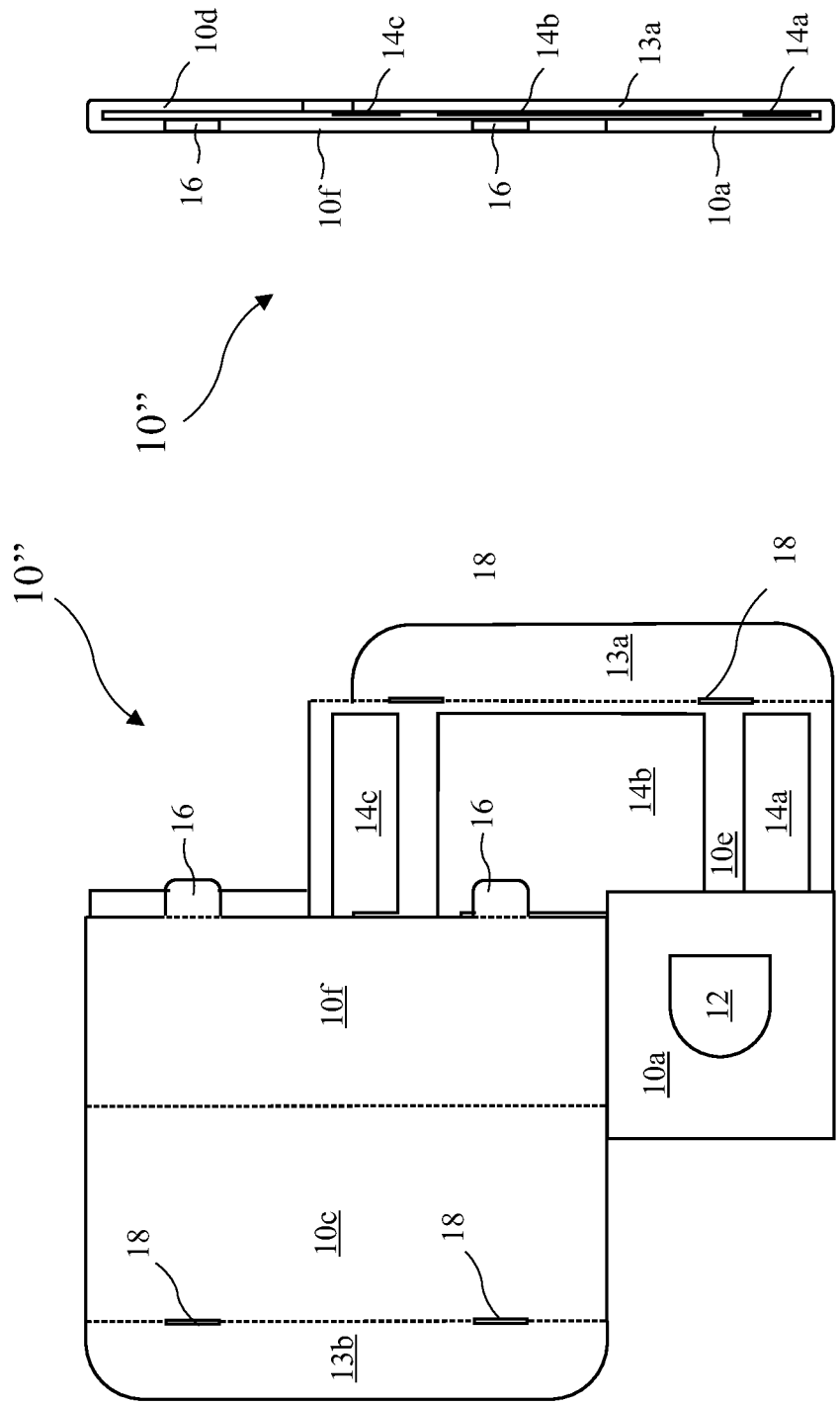

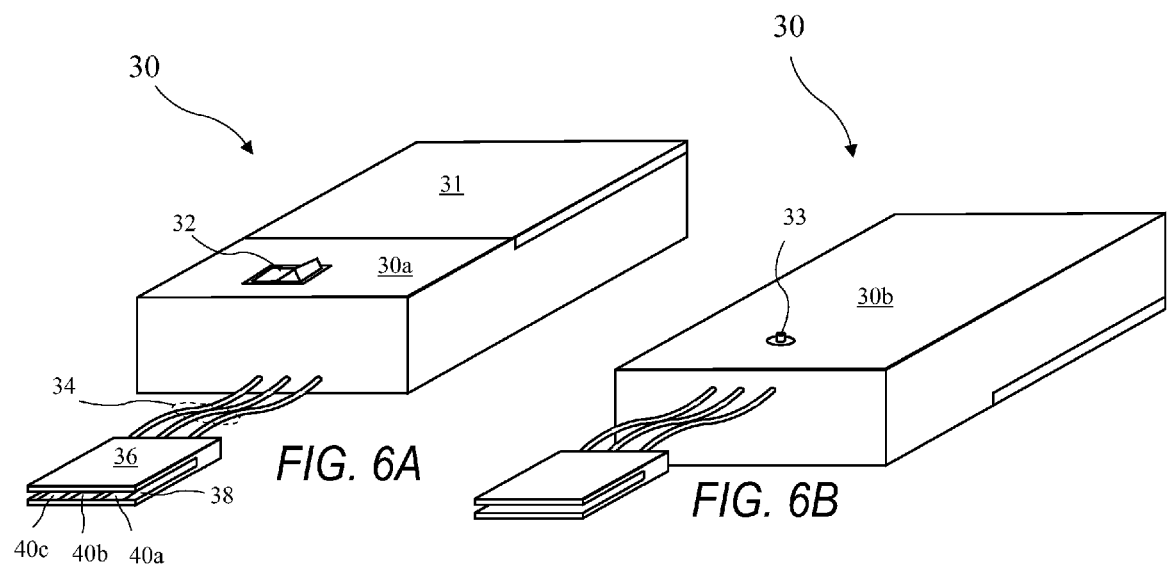
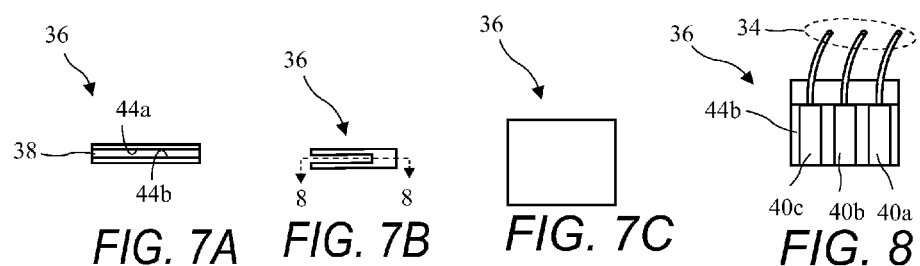
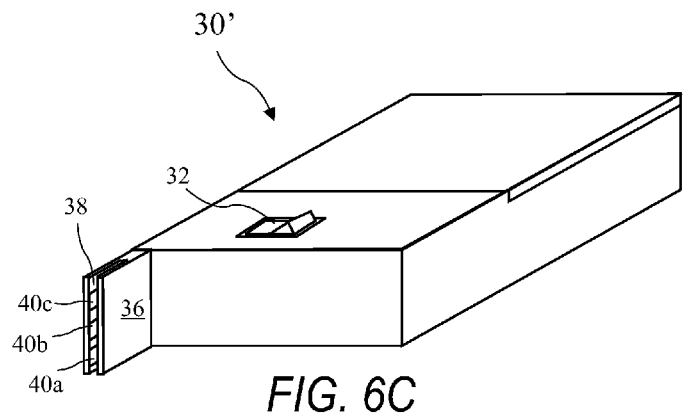

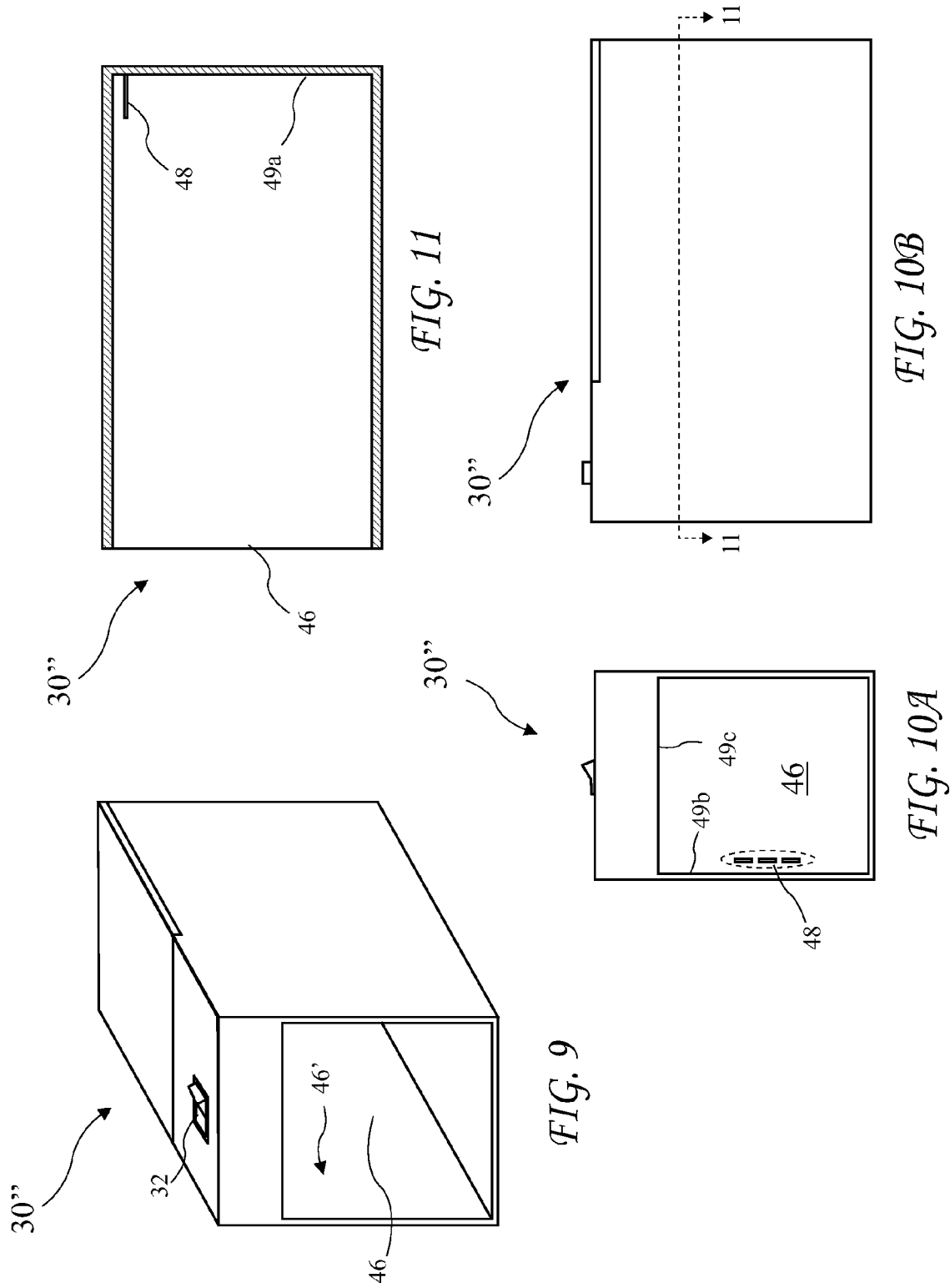

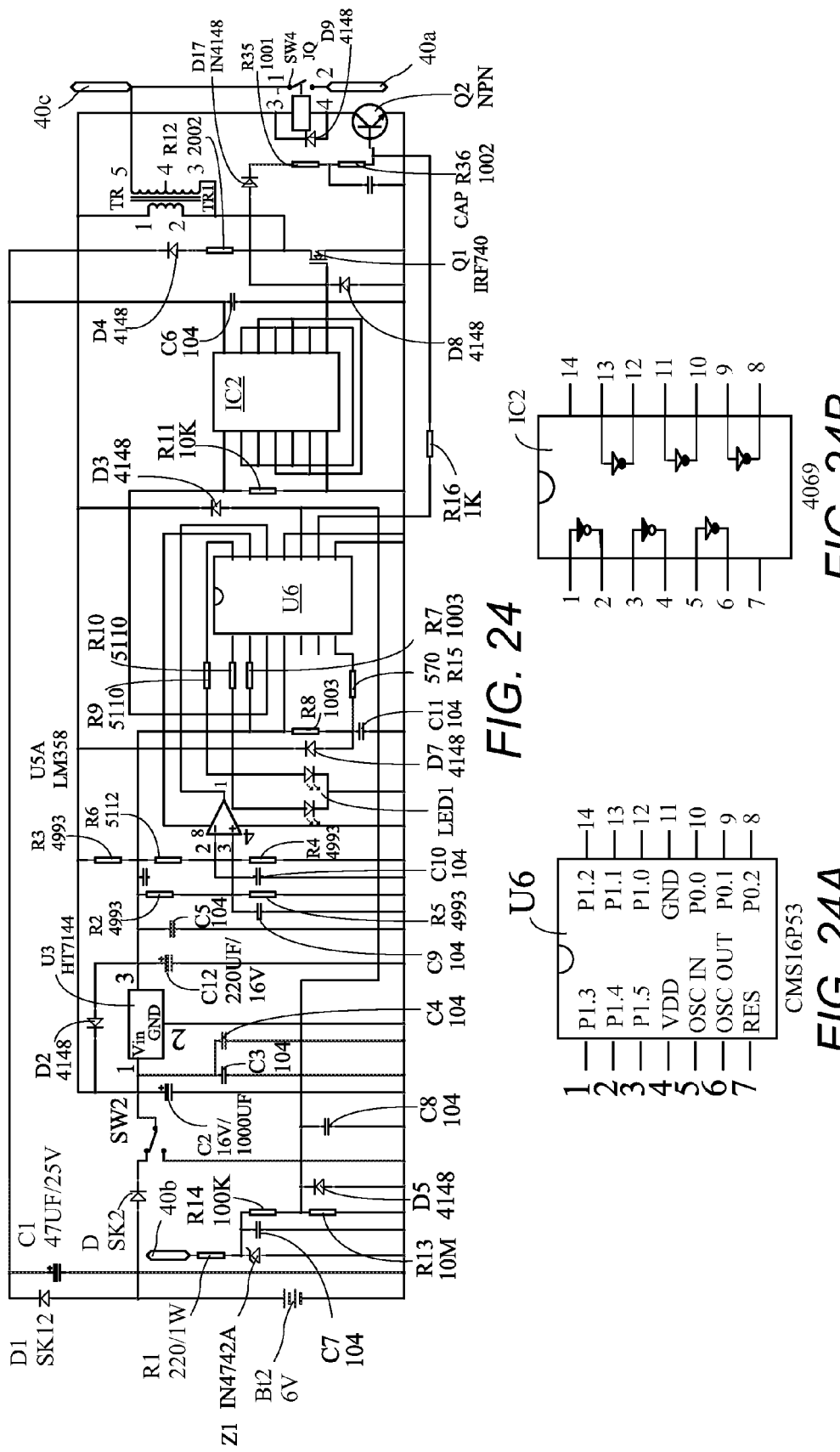

NESTABLE DISPOSABLE CONTAINER FOR PEST ELECTROCUTION

The present application is a Continuation In Part of U.S. patent application Ser. No. 12/406,452 filed Mar. 18, 2009, which application is incorporated in its entirety herein by reference.

BACKGROUND OF THE INVENTION

The present invention relates to pest management and in particular to a low cost disposable container for containing and disposing of an electrocuted pest.

Pests such as rodents present both a nuisance and a heath risk at residences, farms, ranches, and recreational areas. Additionally, urban areas, factories, restaurants, etc. often face rodent infestations. Various mechanical traps are available but generally include some type of grasping mechanism which may be difficult to set and cause discomfort or injury if released on a user's hand. Poisons are also commonly used, but may create their own health risks. For these and other reasons, users are often reluctant to use traditional measures.

U.S. Pat. Nos. 5,269,091 and 5,949,636 disclose portable pest electrocution devices which overcome some of the issues present in mechanical traps and poisons. The '091 and '636 patents describe electrical circuits for sensing the presence of a pest and creating a high voltage signal to electrocute the pest. Unfortunately, both devices require removal of dead pests from the device for disposal. Such removal may involve accidental contact with the dead pest, or an unpleasant experience. Pests are also known to carry diseases, and contact with them may present a heath risk. The '091 and '636 patents are incorporated herein by reference.

BRIEF SUMMARY OF THE INVENTION

The present invention addresses the above and other needs by providing a method and apparatus for electrocution and disposal of pests, the apparatus including a reusable power source and a low cost disposable container. The reusable power source includes batteries and a circuit to provide a high voltage and low current signal to the disposable container, to electrocute small pests without presenting a risk to humans or pets. The disposable container is constructed from low cost material, for example, cardboard or plastic, and in one embodiment may be nested for efficient retail packaging. The nesting may be accomplished using tapered disposable containers or a series of decreasing size containers. A container floor includes conducting surfaces formed or glued on the floor. Internal leads and connector surfaces are similarly formed on sides and a rear of the container. The connector surfaces are configured to connect to the power source.

In accordance with one aspect of the invention, there is provided a method for electrocution and disposal of pests. The method includes providing a power source providing a high voltage and low current signal for electrocution of the pests without presenting risks to humans and a low cost disposable container. Leads are connected from the power source to the low cost disposable container, the leads having a female connector and the low cost disposable container having a male connector. The power supply is switched on and the user waits for a pest to be electrocuted. After the pest has been electrocuted, the power supply is switch OFF and the leads are disconnected from the low cost disposable container. The low cost disposable container containing the electrocuted pest is then disposed of without requiring handling the dead pest.

In accordance with another of the invention, there is provided a low cost disposable container disconnectably connectable to a high voltage and low current power source. The low cost disposable container is foldable to a flat form for packaging and configurable into a container for use. The low cost disposable container includes conducting areas for making contact with the pest to electrocute the pest, and in one embodiment, to sense the presence of the pest. The container contacts and extensions connecting the conducting areas to the container contacts are preferably integrally formed as a thin layer of electrically conductive material glued to the interior of the low cost disposable container or formed on the interior of the low cost disposable container. The interior of the low cost disposable container may be formed from a cutout of a flat sheet and is preferably formed from plastic or a paper product and more preferably from a paper product. The low cost disposable container may thus be disposed of after each use.

In accordance with yet another of the invention, there is provided a low cost nestable disposable container. The nestable disposable container may be tapered to allow nesting, or a series of decreasing size containers to allow nesting. Such nesting facilitates retail packaging.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Cancelled.

Figure 4A:
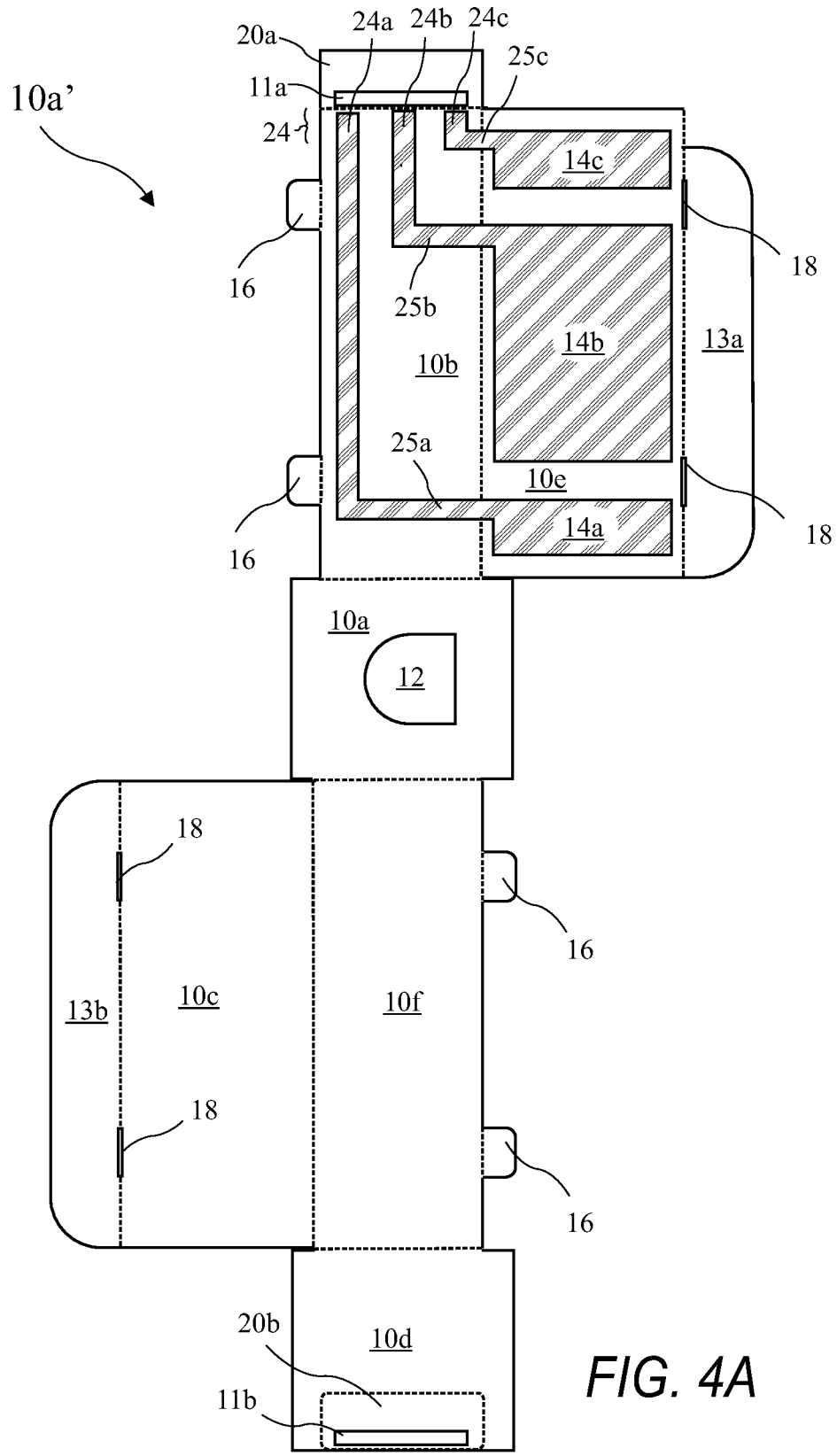

FIG. 4A shows a cutout according to the present invention suitable for construction of the low cost disposable container.

Figure 4B:
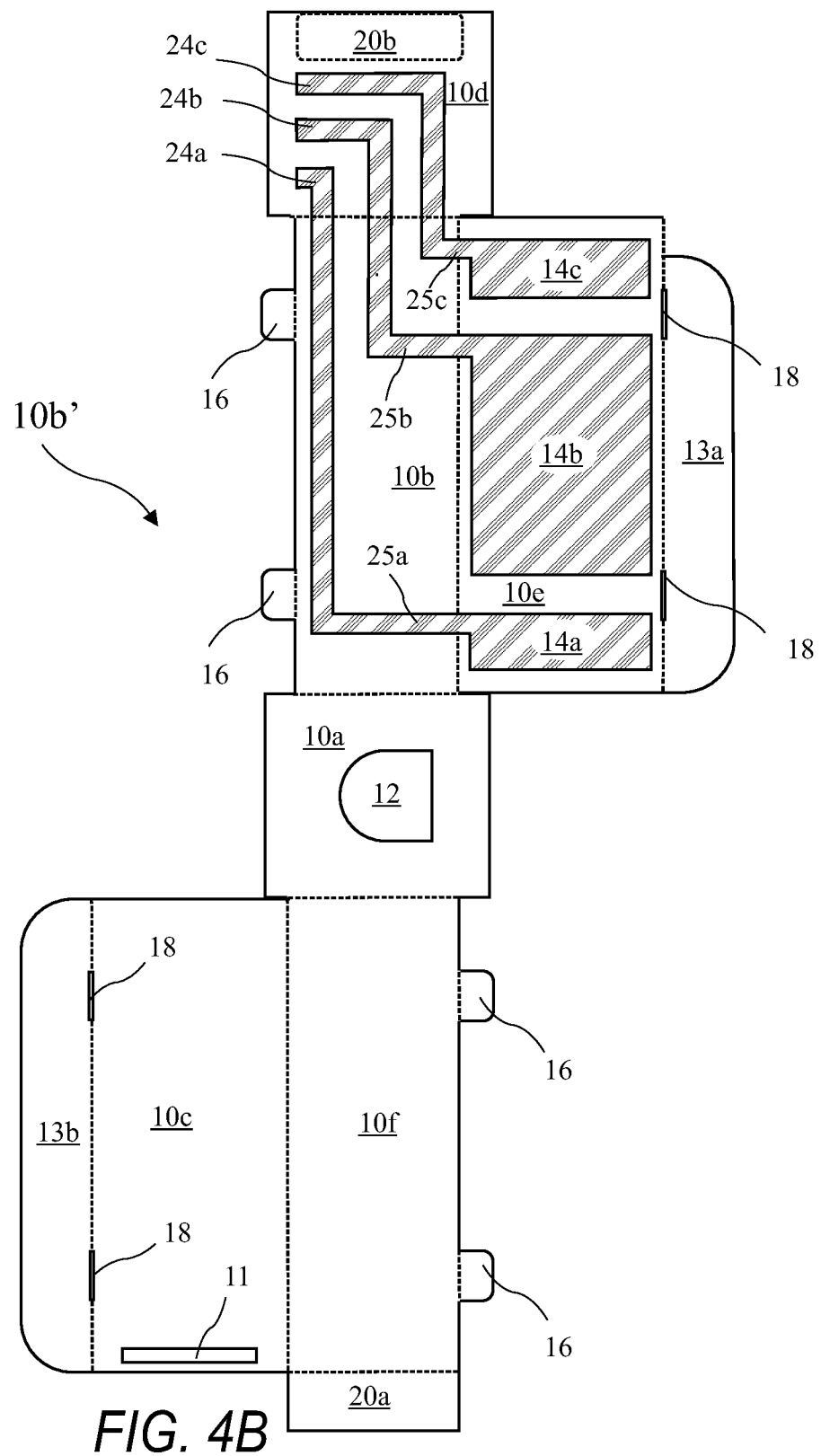

FIG. 4B shows a second cutout according to the present invention suitable for construction of the low cost disposable container.

FIG. 4C shows a third cutout according to the present invention suitable for construction of the low cost disposable container.

FIG. 4D shows a fourth cutout according to the present invention suitable for construction of the low cost disposable container for a large rodent.

FIG. 4E shows a fifth cutout according to the present invention suitable for construction of the low cost disposable container for a small rodent.

FIG. 5A shows a top view of the low cost disposable container in a flat folded form suitable for retail packaging according to the present invention.

FIG. 5B shows an edge view of the low cost disposable container in the flat folded form suitable for retail packaging according to the present invention.

FIG. 6A is a top perspective view of a high voltage, low current, power source with leads and a female connector according to the present invention.

FIG. 6B is a bottom perspective view of the high voltage, low current, power source with leads and a female connector according to the present invention.

FIG. 6C is a top perspective view of a second high voltage, low current, power source with a female connector attached directly to the power source according to the present invention.

FIG. 7A is a front view of the female connector according to the present invention.

FIG. 7B is a side view of the female connector according to the present invention.

FIG. 7C is a top view of the female connector according to the present invention.

FIG. 8 is a cross-sectional view of the female connector according to the present invention taken along line 7-7 of FIG. 7B.

FIG. 9 is a perspective view of a second power source according to the present invention having a mouth for receiving the low cost disposable container.

FIG. 10A is a front view of the second power source.

FIG. 10B is a side view of the second power source.

FIG. 11 is a cross-sectional view of the second power source taking along line 11-11 of FIG. 10B.

Figure 12:
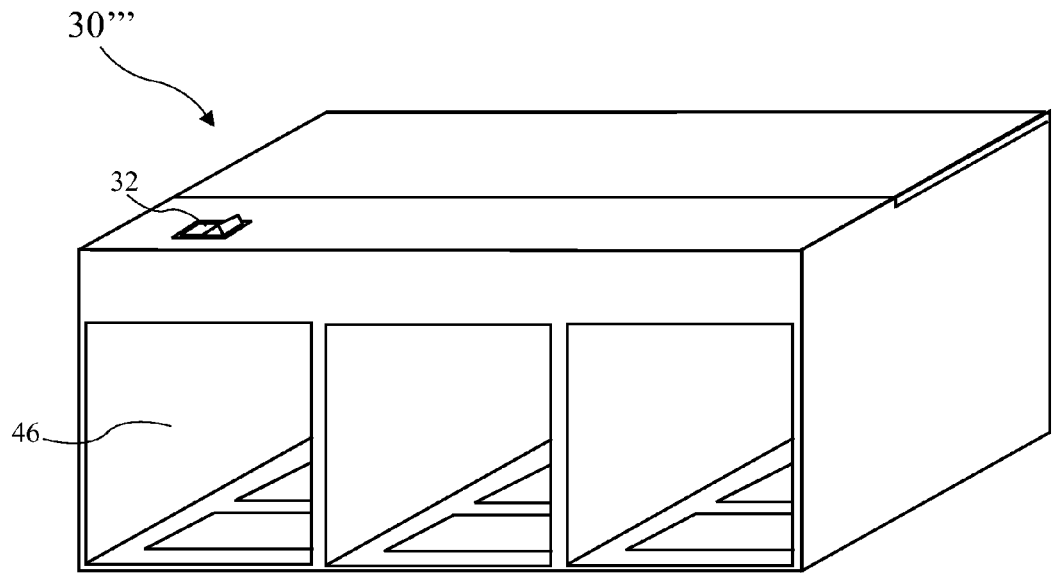

FIG. 12 is a multi-mouth power source according to the present invention having mouths for receiving several low cost disposable containers.

Figure 13:
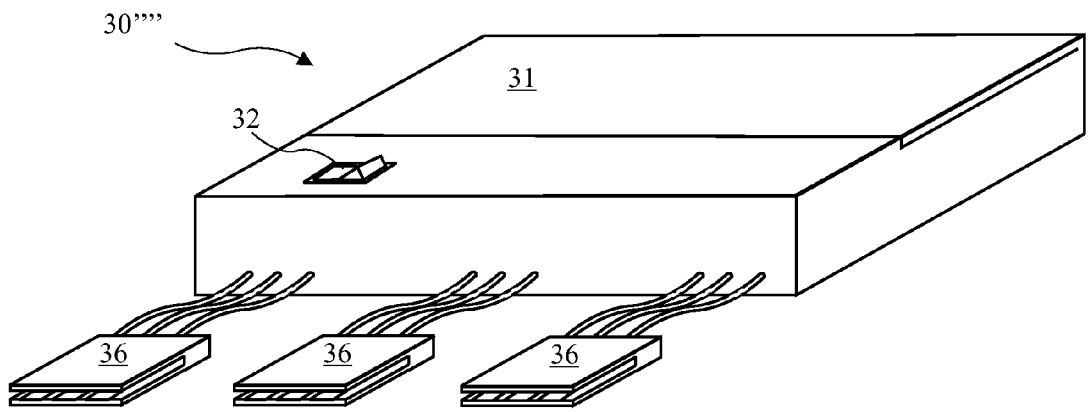

FIG. 13 is a multi-connector power source according to the present invention having several connectors for connecting to several low cost disposable containers.

Figure 14:
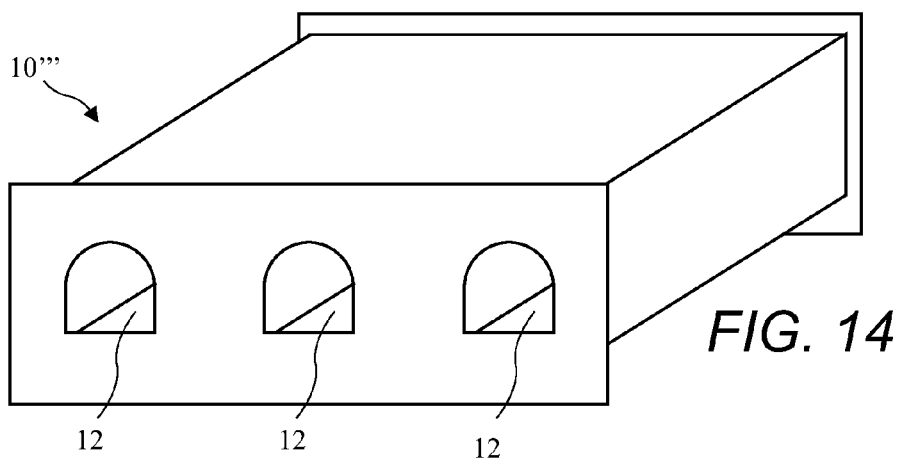

FIG. 14 is a multi-room container according to the present invention having multiple rooms for electrocuting multiple pests.

Figure 15:
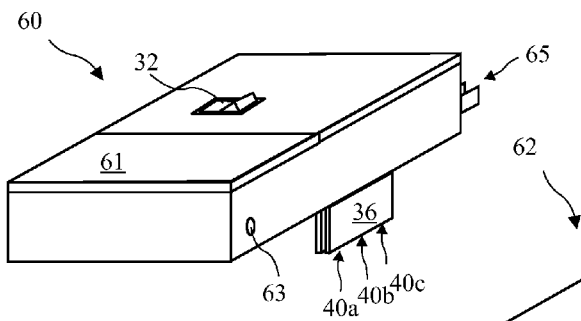

FIG. 15 is perspective view of a power source with an attached connector according to the present invention.

Figure 16:
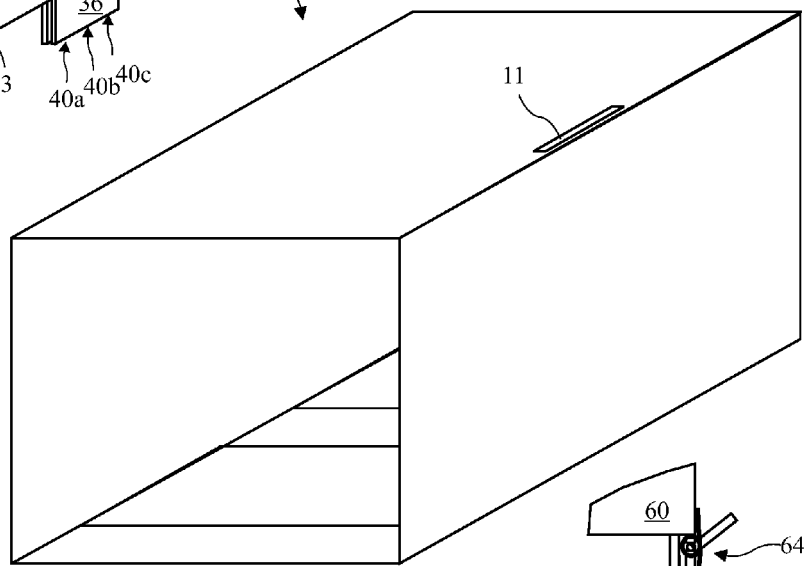

FIG. 16 is a perspective view of a low cost disposable container with a connector passage in the top according to the present invention.

Figure 17:
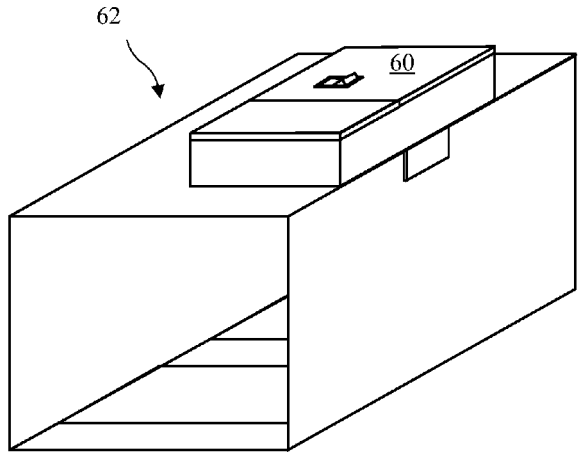

FIG. 17 shows the power source with an attached connector attached to the low cost disposable container with a connector passage in the top according to the present invention.

Figure 18:
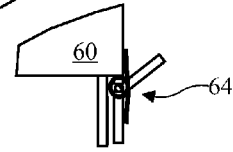

FIG. 18 shows a springed connector according to the present invention.

Figure 19:
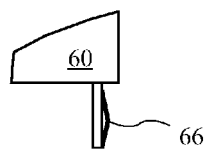

FIG. 19 shows a springed contact connector according to the present invention.

Figure 20:
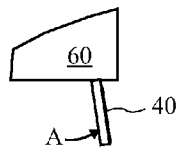

FIG. 20 shows and angled connector according to the present invention.

Figure 21:
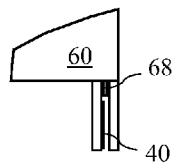

FIG. 21 shows an activation switch included in the connector according to the present invention.

Figure 22A:
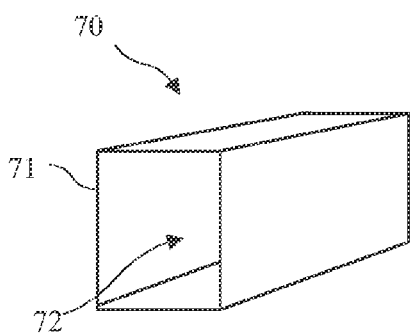

FIG. 22A shows a perspective view of a tapered nestable low cost disposable container according to the present invention.

Figure 22B:
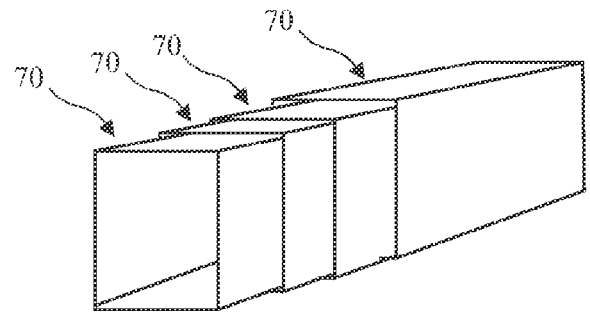

FIG. 22B shows a perspective view of four of the tapered nestable low cost disposable containers, nested according to the present invention.

Figure 23A:
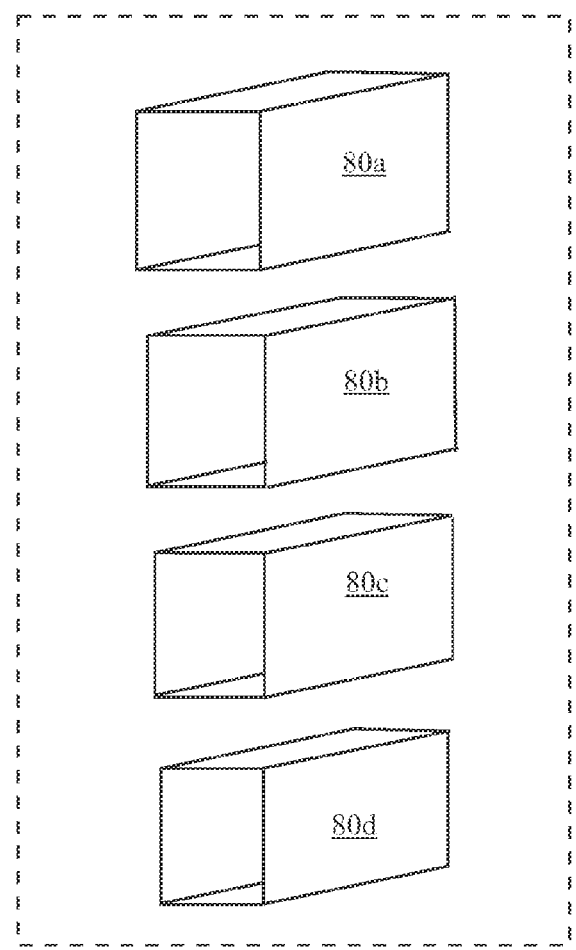

FIG. 23A shows perspective views of four nestable low cost disposable container according to the present invention.

Figure 23B:
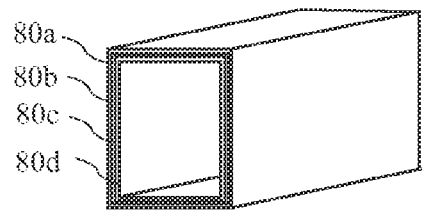

FIG. 23B is a perspective view of four decreasing size nestable low cost disposable containers nested according to the present invention.

FIG. 24 is a diagram of a circuit providing sensing, and a high voltage and low current signal according to the present invention suitable for use in the power source.

FIG. 24A shows an element U6 of FIG. 24.

FIG. 24B shows an element IC2 of FIG. 24.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
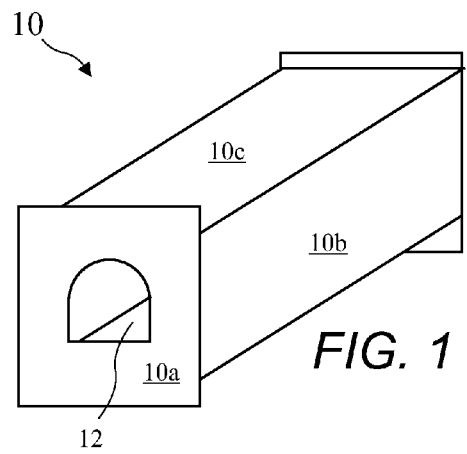
FIG. 1 is a perspective view of a low cost disposable container according to the present invention.
Figure 2A:
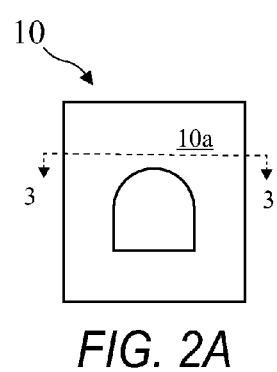
FIG. 2A is a front view of the low cost disposable container.
Figure 2C:
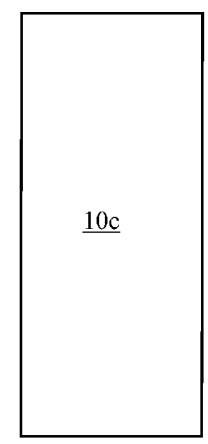
FIG. 2C is a top view of the low cost disposable container.
Figure 2B:
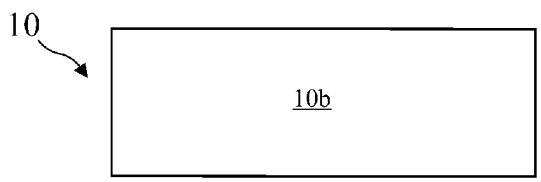
FIG. 2B is a side view of the low cost disposable container.
Figure 2D:
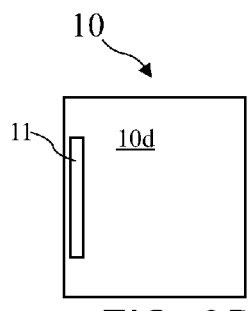
FIG. 2D is a rear view of the low cost disposable container.

A perspective view of a low cost disposable container 10 according to the present invention is shown in FIG. 1, a front view of the low cost disposable container 10 showing the front 10a of the low cost disposable container 10 is shown in FIG. 2A, a side view of the low cost disposable container 10 showing the right side 10b of the low cost disposable container 10 is shown in FIG. 2B, a top view of the low cost disposable container 10 showing the top 10c of the low cost disposable container 10 is shown in FIG. 2C, and a rear view of the low cost disposable container 10 showing the rear 10d of the low cost disposable container 10 is shown in FIG. 2D. The low cost disposable container 10 is connected to a power source 30 (see FIG. 6) to provide apparatus for electrocuting pests, and in particular, small rodents. The low cost disposable container 10 thus has walls comprising the front 10a, the right side 10b, the top 10c, the rear 10d, the floor 10e, and the left side 10f (not shown).

The low cost disposable container 10 is preferably constructed from non-conductive material, for example, a plastic or a paper product and more preferably from a paper product, and may be folded into a flat folded form for packaging for sale. Paper construction is preferred over plastic because rodents are often more comfortable around paper products and odors released by plastics may repel rodents. In the instance of either material, the electric quality of the container 10 is preferably provided by applying a conductive material to the paper or plastic material used to construct the container. In one embodiment, the container 10 is constructed of a paper and plastic laminate.

The low cost disposable container 10 includes an entry 12 in the front 10a allowing pests to enter the low cost disposable container 10. The rear 10d includes a passage 11 allowing insertion of a connector 36 (see FIG. 6) and a sensor port 13 allowing insertion of a sensor 50 (see FIG. 6A) into the container. The connector 36 includes spaced apart connector contacts 40a-40c (see FIG. 8) which electrically connect with spaced apart container contacts 24a-24c to electrically connect the power source 30 to the low cost disposable container 10.

Figure 3:
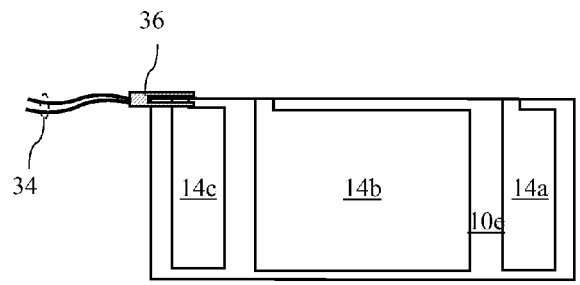
FIG. 3 is a cross-sectional view of the low cost disposable container taken along line 3-3 of FIG. 2A showing a container floor having three conducting areas.

A cross-sectional view of a top surface of a flat cutout for forming the low cost disposable container 10 taken along line 3-3 of FIG. 2A is shown in FIG. 3. Three conducting areas 14a, 14b, and 14c reside on a floor 10e of the low cost disposable container 10. The conducting areas 14a, 14b, and 14c are preferably a metal foil glued to the floor 10e or a coating deposited on the floor 10e. Each of the conducting areas 14a, 14b, and 14c is preferably connected to the power source 30 by separate electrical connections and cooperate with the power source 30 to provide sensing and electrocution functions. The power source 30 senses the resistance between the first conducting area 14a and second conducting area 14 to sense the presence of a pest in the low cost disposable container 10. Once the presence of the pest is sensed, a high voltage and low current signal is connected between the first and second conducting areas 14a and 14b, and between the second and third conducting areas 14b and 14c, thereby electrocuting the pest when the pest contacts both the first and second conducting areas 14a and 14b or contacts both the second and third conducting areas 14b and 14c. Leads 34 and a female connector 36 disconnectably electrically connect to electrical contacts 24a-24c (see FIG. 4A). residing on an interior surface of the low cost disposable container 10. A lip 44b (see FIG. 7A) enters the low cost disposable container 10 through the passage 11 and lip 44a and the lip 44b sandwich the side 10b to form the electrically connection between the electrical contacts 24a-24c and contacts 40a-40c (see FIG. 8) on the lip 44b.

A second embodiment of the low cost disposable container 10 includes a single conducting area 14 residing on the floor 10e of the low cost disposable container 10. A circuit to conduct electricity to electrocute the pest is completed through conducting inner faces of the floor, walls, and/or ceiling of the low cost disposable container 10, or through an external ground.

A cutout 10a' according to the present invention suitable for construction of the low cost disposable container 10 is shown in FIG. 4A. The cutout 10a' may be cut out from any flat sheet, and is preferably cut out from a paper product or a plastic, and more preferably cut out from a paper product. The cutout 10a' includes a bonding tab 20a and a bonding area 20b for bonding to form a closed flat folded form 10'' (see FIGS. 5A and 5B). The cutout 10a' further includes tabs 16 and cuts 18 which cooperate for configuring the flat folded form 10'' into the low cost disposable container 10.

The conducting areas 14a, 14b, and 14c are highlighted by shading in FIG. 4A. And extensions (or conducting paths) 25a, 25b, and 25c of the conducting areas 14a, 14b, and 14c electrically connect the conducting areas 14a, 14b, and 14c to spaced apart container contacts 24a, 24b, and 24c forming a male connector 24 provided to make electrical contact with the spaced apart lead contacts 40a, 40b, and 40c of the female connector 36 (see FIG. 8). The extensions 25a, 25b, and 25c may be any electrically conductive structure, for example, wire leads, or conductive material glued or formed on the cutout 10a', but are preferably conductive material glued or formed on the cutout 10a', and more preferably, the conducting areas 14a, 14b, and 14c, the extensions 25a, 25b, and 25c, and the spaced apart container contacts 24a, 24b, and 24c are all glued or formed as a single step and are continuous layer of conductive material glued or formed as a single step. For example, the conducting areas 14a, 14b, and 14c, the extensions 25a, 25b, and 25c, and the spaced apart container contacts 24a, 24b, and 24c may all be a metal (for example aluminum) glued onto the cutout 10a'. The spaced apart container contacts 24a, 24b, and 24c may alternatively be connected to the conducting areas 14a, 14b, and 14c by wire leads, but at greater manufacturing cost.

A second cutout 10b' according to the present invention suitable for construction of the low cost disposable container is shown in FIG. 4B. The cutout 10b' is similar to the cutout 10a' (see FIG. 4A) except that the spaced apart container contacts 24a, 24b, and 24c reside on the end 10d.

A third cutout 10c' according to the present invention suitable for construction of the low cost disposable container is shown in FIG. 4C. The cutout 10c' is similar to the cutout 10a' (see FIG. 4A) except that the conducting area 14c, the extensions 25c, and the container contact and 24c eliminated, and the remaining spaced apart container contacts 24a and 24b reside on the end 10d.

A fourth cutout 10d' according to the present invention suitable for construction of the low cost disposable container for a large rodent is shown in FIG. 4D. The cutout 10d' includes tab 16 for engaging slot 18, and adhesive 19 for attachment to form the low cost disposable container. The mouth 11 is on the top surface 10c the container. The container 10d' has a length L1, a width W1, and a height H1. The length L1 is preferably approximately 210 mm, the width W1 is preferably 93 mm, and the height H1 is preferably approximately 80 mm.

A fifth cutout 10e' according to the present invention suitable for construction of the low cost disposable container for a small rodent is shown in FIG. 4E. The cutout 10e' includes tab 16 for engaging slot 18, and adhesive 19 for attachment to form the low cost disposable container. The mouth 11 is on the top surface 10c the container. The container 10e' has a length L2, a width W2, and a height H2. The length L2 is preferably approximately 156 mm, the width W2 is preferably 45 mm, and the height H2 is preferably approximately 40 mm. The conducting areas 14a and 14b are recessed approximately a distance R from the entry to prevent or resist a user making contact with the conducting areas 14a and 14b and being shocked. The recess R is preferably approximately 70 mm.

A top view of the low cost disposable container in a flat folded form 10'' suitable for retail packaging, according to the present invention, is shown in FIG. 5A and an edge view of the low cost disposable container in the flat folded form 10'' suitable for retail packaging is shown in FIG. 5B. The cutout 10a'', 10b'', or 10c'' is folded to overlap and glue (or otherwise adhere) the bonding tab 20a and a bonding area 20b for bonding to form a closed flat folded form 10''.

A top front perspective view of a high voltage, low current, power source 30 according to the present invention is shown in FIG. 6A and a bottom perspective view of the power source 30 is shown in FIG. 6B. The power source 30 may include an ON/OFF switch 32 on a top surface 30a and a safety switch 33 on a bottom surface 30b. The switch 32 activates the power source 30. Activation of the power source 30 provides power to circuits (see FIG. 24) in the power source 30, but does not necessarily provide a high voltage signal to the conducting areas 14. Preferably, the power source includes a circuit monitoring the resistance between conducting areas 14 of the container 10. The presence of a pest is detected by a drop in resistance between any two of the conducting areas 14, and the upon sensing the low resistance, the high voltage circuit in the power source is activated to electrocute the pest. In one embodiment, the high voltage signal remains on for about two minutes to ensure the electrocution of the pest, but the time may vary depending on the current and voltage provided, and the size of the expected pest, which is related to the size of the container 10. The power source 30 may be activated by other means, for example, by the safety switch 33, by sensing connection to the container 10, by installing batteries, or by remote control, and a power source having any switching to activate the power source is intended to come within the scope of the present invention.

The safety switch 33 is preferably a simple plunger type switch which disables (de-activates) the power supply 30 when the power supply is not lying on a flat surface ready for use. For example, the power supply 30 is disabled when lifted to prevent accidental shocks to a user. Leads 34 and a female connector 36 are connected to the power source 30 for connection to the low cost disposable container 10. As an alternative to sensing resistance between the conducting areas 14, a sensor 50 may be inserted into the container 10 for detecting the presence of a pest in the container and may be electrically connected to the power source 30 by a lead 34 which may include multiple conductors to support the functions of the sensor 50. The sensor 50 may be an IR sensor, a motion sensor, a distance sensor, or any sensor suitable for detecting the presence of a pest in the container 10. The sensor 50 and connector 36 may also be integrated into a single plug or connector. When the sensor 50 detects the presence of a pest in the container 10, the high voltage circuit in the power source 30 is activated to electrocute the pest.

A top perspective view of a second high voltage, low current, power source 30' according to the present invention is shown in FIG. 6C. The female connector 36 and sensor 50 are attached directly to the power source 30'.

A front view of the female connector 36 according to the present invention is shown in FIG. 7A, a side view of the female connector 36 is shown in FIG. 7B, a top view of the female connector 36 is shown in FIG. 7C, and a cross-sectional view of the female connector 36 taken along line 8-8 of FIG. 7B is shown in FIG. 8. The connector 36 is a split female connector in that the connector contacts 40a, 40b, and 40c reside on a second lip 44b facing a first lip 44a, the lips 44a and 44b are generally parallel and separated by a split (or slot) 38, and thus are not on an exterior surface of the connector 36. The connector 36 is generally inserted into the low cost disposable container 10 through the passage 11 to electrically connect the power source to the low cost disposable container 10.

The connector 36 is called a female connector even though the container 10 is shown with a mouth 11 (see FIG. 2D) for the connector 36 to be inserted into because the electrical contacts 24a-24c reside on an interior surface of the low cost disposable container 10 to prevent or reduce the chance of shocking a user. While such female connector is preferred, a pest electrocution device having a power source with a male connector, for example prongs for insertion into the container 10, is also intended to come within the scope of the present invention.

A perspective view of a third power source 30" according to the present invention, having a mouth 46 having surfaces 46' including a back 49a, a side 49b, a floor 49d and a roof 49c for receiving the low cost disposable container 10, is shown in FIG. 9, a front view of the third power source 30" is shown in FIG. 10A, a side view of the third power source 30" is shown in FIG. 10B, and a cross-sectional view of the second power source taking along line 11-11 of FIG. 10B is shown in FIG. 11. The mouth 46 allows the low cost disposable container 10 to be inserted into the third power source 30" for use, and to be removed for disposal. Contacts 48 reside on or near the back 49a of the interior of the third power source 30" for making electrical contact with the low cost disposable container 10. Alternatively, the low cost disposable container 10 may include male contacts extending from the inserted end of the low cost disposable container 10 for insertion into a female connector inside the third power source 30".

A multi-mouth power source 30''' according to the present invention having mouths for receiving several low cost disposable containers 10 is shown in FIG. 12, a multi-connector power source 30'''' according to the present invention having several connectors for connecting to several low cost disposable containers 10 is shown in FIG. 13, and a multi-room container 10''' according to the present invention having multiple rooms for electrocuting multiple pests is shown in FIG. 14. The power sources 30''' and 30'''' are otherwise similar to the power sources 30, 30', and 30", and the container 10''' is otherwise similar to the container 10.

The multi-mouth power source 30''' may also have a single large mouth 46 accepting a container having multiple chambers for executing multiple pests, the three connectors 36 attached to the power source 30'''' may also be combined into a single connector, and the multi-room container 10''' may accept separate multiple connectors 36 or a single connector with additional contacts.

A perspective view of a power source 60 with an attached connector 36 according to the present invention is shown in FIG. 15, a perspective view of a low cost disposable container 62 with a connector passage 11 in the top is shown in FIG. 17, and the power source 60 attached to the low cost disposable container 62 is shown in FIG. 17. The connector passage 11 is along one side of the top of the disposable container 62, but may be on either side, or at the rear of the disposable container 62. The attached connector 36 may be on one side of the power source 60 or at the rear, and is positioned to insert into the connector passage 11 when the power source 60 is resting on the top of the disposable container 62.

The power source 60 may include a switch 32, a battery compartment door 61, and/or a terminal 63 for a charger and/or a pair of connectors 65 for directly connecting to an electrical outlet. The attached connector 36 comprise two fixed opposing lips which sandwich the side or rear of the disposable container 62, or may be a fixed insertable lip and a spring loaded external lip 64, similar to one side of an alligator clip as shown in FIG. 18. The attached connector 36 may further be a single insertable lip with flexible contacts 66 which are biased to rest against the side of rear of the disposable container 62 as shown in FIG. 19, or be formed at a shallow angle A, such that the contacts are pushed against the inside wall or rear of the disposable container 62 as shown in FIG. 20.

A switch 68 included in the connector 36 is shown in FIG. 21. The power source 60 may include the switch 32 or the switch 68. The switch 68 will generally only activate the power source 60 when the connector 36 is electrically connected to the container 62. The switch 68 may be a plunger type switch or a cantilever type switch, and performs the functions of the switch 32, or may be an additional switch providing safety function.

A perspective view of a tapered nestable low cost disposable container 70 according to the present invention is shown in FIG. 22A, and a perspective view of four tapered nestable low cost disposable containers 70 nested is shown in FIG. 22B. The nested containers require less volume for packaging thus reducing shipping costs and shelf space. The containers 70 have a completely open front 71 facilitating compact nesting of the containers 70. In the context of the present patent invention, the term "nested" is defined here as at least two three dimensional objects where one of the objects 70 is insertable into the interior 72 of the other of the objects.

A perspective view of four nestable decreasing size low cost disposable containers 80a-80d according to the present invention are shown in FIG. 23A and a perspective view of the four disposable containers 80a-80d nested according to the present invention is shown in FIG. 23B. The disposable containers 80a-80d share the advantages of the disposable container 70, but are limited in the number of containers which may be nested and retain a useful size, however providing greater volume saving because all of the series of disposable containers may fit into the first largest disposable container in the series.

A diagram of a preferred circuit providing sensing and a high voltage and low current signal according to the present invention is shown in FIG. 24 and elements U6 and IC2 of the circuit are shown in FIGS. 24A and 24B respectively. The circuit is suitable for use in the power source, although other circuits, including those discloses in U.S. Pat. Nos. 5,269,091 and 5,949,636 incorporated by reference above, are also suitable. While the power source is preferably battery powered, the power source may also be a plug in power source adapted to plug into a typical wall outlet, for example, 115 or 120 volt AC power. The power source may also be configured to accept either battery or wall outlet power.

The power source and container according to the present invention may also be individually water proof and/or the power source and container may be used with a water proof housing which resists the entry of water and allows the entry of pests.

Various means of detecting the presence of a pest in the container 10 are known in the art, and a pest electrocution device with a disposable container as described above using any method of detecting the presence of a pest to trigger the device is intended to come within the scope of the present invention.

While the invention herein disclosed has been described by means of specific embodiments and applications thereof, numerous modifications and variations could be made thereto by those skilled in the art without departing from the scope of the invention set forth in the claims.

I claim:

1. A pest electrocution apparatus comprising:
   a plurality of nestable disposable containers configured to nest together, consecutive ones of the nestable disposable containers nestable inside other ones of the nestable disposable containers, for compact packaging and separable for individual use;
   a reusable power source electrically connectable to each of the plurality nestable disposable containers, the power source providing a high voltage and low current signal suitable for electrocution of the pests and not presenting an electrocution risk to humans or pets;
   a first electrical connector electrically connected to the power source and in electrical communication with the high voltage and low current signal; and
   each of the plurality of nestable disposable containers comprising:
      a generally horizontal floor;
      a vertically extending right side;
      a vertically extending left side opposite the right side;
      a rear side;
      an open front; a top;
      an interior volume bounded by the floor, the right side, the left side; the rear, and the top; and
      an interior surface facing the interior volume;
      a connector passage through one of:
         the right side of each nestable disposable container;
         the left side of each nestable disposable container;
         the rear side of each nestable disposable container; and
         the top of each nestable disposable container;
      at least two flat, exposed, spaced apart conducting areas residing spaced apart on the floor of each nestable disposable container facing the interior volume of each nestable disposable container;
      a second electrical connector having at least two spaced apart flat electrical contacts residing on the interior surface of each nestable disposable container adjacent to the connector passage, the two spaced apart flat electrical contacts laying on at least one of:
         the top of each nestable disposable container;
         the floor of each nestable disposable container;
         the right side of each nestable disposable container;
         the left side of each nestable disposable container; and
         the rear side of each nestable disposable container;
      at least two flat spaced apart electrically conducting paths residing on the interior surface of each nestable disposable container that are electrically connecting the two flat conducting areas to the at least two spaced apart flat electrical contacts, the electrically conducting paths residing on at least one of:
         the floor of each nestable disposable container;
         the right side of each nestable disposable container;
         the left side of each nestable disposable container
         the top of each nestable container; and
         the rear side of each nestable disposable container,
      wherein the first electrical connector is removably insertable through the connector passage to reside against the at two spaced apart flat electrical contacts to make an electrical connection with the at least two spaced apart flat electrical contacts that place the at least two spaced apart flat electrical contacts in electrical communication with the high voltage and low current signal, and the first electrical connector is removable through the connector passage to separate from the at least spaced apart flat electrical contacts, the electrical connection separated by removing the first electrical connector from the connector passage; and
      wherein the first electrical connector and the reusable power source are separable from each nestable disposable container, and each nestable disposable container containing an electrocuted pest is disposable separate from the reusable power source after use and the reusable power source is connectable to another of the plurality of nestable disposable containers, and
      the nestable disposable containers are tapered where the open front is larger than the rear side to allow nesting of a stackable series of the nestable disposable containers,
      wherein at least one of said stackable series of nestable disposable containers is at least partially insertable into the interior volume of another of said stackable series of the plurality of nestable disposable containers.

2. The apparatus of claim 1, wherein the spaced apart electrically conducting areas comprise an electrically conducting material deposited onto the floor of each nestable disposable container.

3. The apparatus of claim 1, wherein the spaced apart electrically conducting areas comprise an electrically conducting material glued on the floor of each nestable disposable container.

4. The apparatus of claim 1, wherein each of the nestable disposable containers have a height of approximately three inches and a width of approximately 3.5 inches to prevent or reduce the chance of a user touching the electrically conducting areas and being shocked.

5. The apparatus of claim 1, further including a switch on the first electrical connector and the power source is activated whenever the first electrical connector is connected to one of the nestable disposable containers.

6. The apparatus of claim 1, wherein the first connector comprises a pair of flat lips, a first flat lip facing a second flat lip and configured to sandwich one of:
   the right side of each nestable disposable container;
   the left side of each nestable disposable container;
   the rear of each nestable disposable container; and
   the top of each nestable disposable container;
   the second flat lip insertable into the connector passage in the containers and carrying first connector contacts to electrically connect with the at least two spaced apart flat electrical contacts residing on the interior surface of each nestable disposable container.

7. The apparatus of claim 1, wherein the first connector comprises a flat lip and an arm biased towards the flat lip, the arm and the flap lip configured to sandwich one of:
   the right side of each nestable disposable container;
   the left side of each nestable disposable container;
   the rear of each nestable disposable container; and
   the top of each nestable disposable container;
   the flat lip insertable into the connector passage in the nestable disposable containers and carrying first connector contacts to electrically connect with the at least two spaced apart flat electrical contacts residing on the interior surface of each nestable disposable container.

8. The apparatus of claim 1, wherein the first connector comprises an angled flat lip insertable into the connector passage in the nestable disposable containers and carrying first connector contacts to electrically connect with the at least two spaced apart flat electrical contacts residing on the interior surface of each nestable disposable container, the angled flat lip angled away from vertical to press the first connector contacts against the at least two spaced apart flat electrical contacts when the power source is resting on the top of each nestable disposable container.

9. The pest electrocution apparatus of claim 1, wherein the first electrical connector is a plug-in connector, connectable by insertion into each of the nestable disposable containers, the insertion creating an electrical connection with the two spaced apart flat electrical contacts to provide the high voltage and low current signal to each of the nestable disposable containers.

10. The apparatus of claim 1, wherein the spaced apart contacts, the electrically conducting paths, and the electrically conducting areas are commonly formed by glued on electrically conducting material.

11. The apparatus of claim 2, wherein the second connector comprises flat spaced apart contacts on the interior surface of each nestable disposable container.

12. A pest electrocution apparatus comprising:
a plurality of nestable disposable containers configured to nest together, consecutive ones of the nestable disposable containers nestable inside other ones of the nestable disposable containers, for compact packaging and separable for individual use;
a reusable power source electrically connectable to each of the plurality nestable disposable containers, said power source providing a high voltage and low current signal suitable for electrocution of the pests and not presenting an electrocution risk to humans or pets;
a first electrical connector electrically connected to said power source in electrical communication with the high voltage and low current signal; and
each of the plurality of nestable disposable containers comprising:
  a generally horizontal floor; a vertically extending right side;
  a vertically extending left side opposite the right side; a rear side;
  an open front; a top;
  an interior volume bounded by the floor, the right side, the left side, the rear side, and the top; and
  an interior surface facing the interior volume;
a connector passage through one of:
  the right side of each nestable disposable container;
  the left side of each nestable disposable container;
  the rear side of each nestable disposable container; and
  the top of each nestable disposable container;
at least two flat, exposed, spaced apart conducting areas residing spaced apart on the floor of each nestable disposable container facing the interior volume of each nestable disposable container;
a second electrical connector having at least two spaced apart flat electrical contacts residing on the interior surface of each nestable disposable container adjacent to the connector passage, the at least two spaced apart flat electrical contacts laying on at least one of:
  the top of each nestable disposable container;
  the floor of each nestable disposable container;
  the right side of each nestable disposable container;
  the left side of each nestable disposable container; and
  the rear side of each nestable disposable container;
at least two flat spaced apart electrically conducting paths residing on the interior surface of each nestable disposable container and electrically connecting the two flat conducting areas to the two spaced apart flat electrical contacts, the electrically conducting paths residing on at least one of:
  the floor of each nestable disposable container;
  the right side of each nestable disposable container;
  the left side of each nestable disposable container;
  the top of each nestable container; and
  the rear side of each nestable disposable container,
wherein the first electrical connector is removably insertable through the connector passage to reside against the two spaced apart flat electrical contacts to make an electrical connection with the two spaced apart flat electrical contacts to place the two spaced apart flat electrical contacts in electrical communication with the high voltage and low current signal, and
the first electrical connector is removable through the connector passage to separate from the two spaced apart flat electrical contacts, the electrical connection separated by removing the first electrical connector from the connector passage; and
wherein the first electrical connector and said power source are separable from each nestable disposable container, and
each nestable disposable container containing an electrocuted pest is disposable separate from said power source after use and said power source is connectable to another of the plurality of nestable disposable containers,
wherein the nestable disposable containers comprise a series of decreasing cross-sectional-sized containers, and
wherein at least one of said stackable series of nestable disposable containers at least partially insertable into the interior volume of another of said stackable series of the plurality of nestable disposable containers and allows insertion of the rear side through the open front.

13. The apparatus of claim 12, wherein the spaced apart electrically conducting areas comprise an electrically conducting material deposited onto the floor of each nestable disposable container.

14. The apparatus of claim 12, wherein the spaced apart electrically conducting areas comprise an electrically conducting material glued on the floor of each nestable disposable container.

15. The apparatus of claim 12, wherein the spaced apart contacts, the electrically conducting paths, and the electrically conducting areas are commonly formed by glued on electrically conducting material.

16. The apparatus of claim 12, wherein the first connector comprises a pair of flat lips, a first flat lip facing a second flat lip and configured to sandwich one of:
  the right side of each nestable disposable container;
  the left side of each nestable disposable container;
  the rear side of each nestable disposable container; and
  the top of each nestable disposable container;
  the second flat lip insertable into the connector passage in the containers and carrying first connector contacts to electrically connect with the at least two spaced apart flat electrical contacts residing on the interior surface of each nestable disposable container.

17. The apparatus of claim 12, wherein the first connector comprises a flat lip and an arm biased towards the flat lip, the arm and the flap lip configured to sandwich one of:

the right side of each nestable disposable container;
the left side of each nestable disposable container;
the rear side of each nestable disposable container; and
the top of each nestable disposable container;
the flat lip insertable into the connector passage in the nestable disposable containers and carrying first connector contacts to electrically connect with the at least two spaced apart flat electrical contacts residing on the interior surface of each nestable disposable container.

18. The apparatus of claim 12, wherein the first connector comprises an angled flat lip insertable into the connector passage in the nestable disposable containers and carrying first connector contacts to electrically connect with the at least two spaced apart flat electrical contacts residing on the interior surface of each nestable disposable container, the angled flat Hp angled away from vertical to press the first connector contacts against the at least two spaced apart flat electrical contacts when the power source is resting on the top of each nestable disposable container.

19. The pest electrocution apparatus of claim 12, wherein the first electrical connector is a plug-in connector, connectable by insertion into each of the nestable disposable containers, the insertion creating an electrical connection with the two spaced apart flat electrical contacts to provide the high voltage and low current signal to each of the nestable disposable containers.

20. The apparatus of claim 13, wherein the second connector comprises flat spaced apart contacts on the interior surface of each nestable disposable container.

\* \* \* \* \*